May 27, 1941.  K. KORBULY  2,243,382
PUSH BENCH APPARATUS
Filed Feb. 17, 1940  2 Sheets-Sheet 2
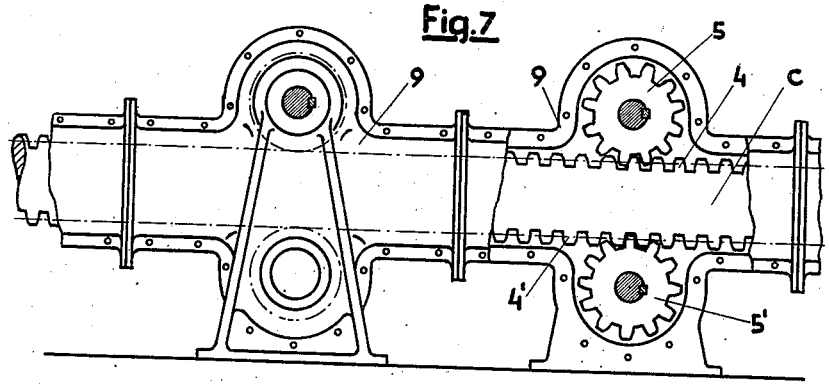
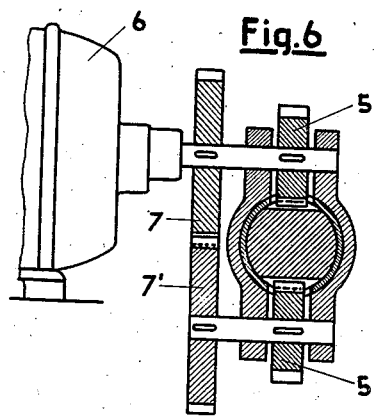
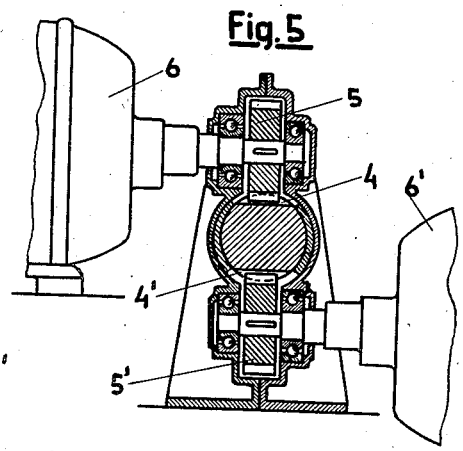
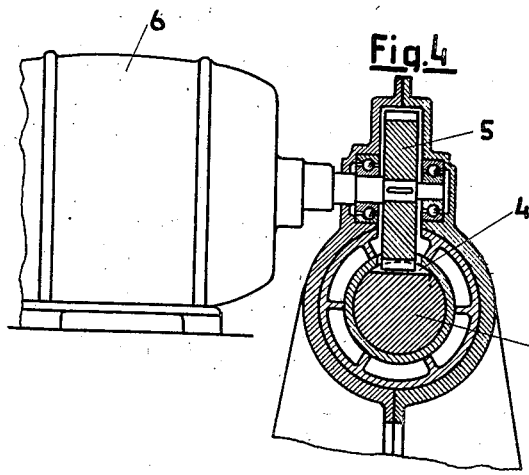
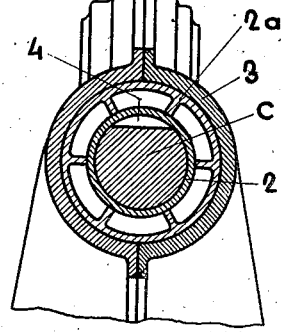
INVENTOR
KAROLY KORBULY
BY Young, Emery & Thompson
ATTYS.

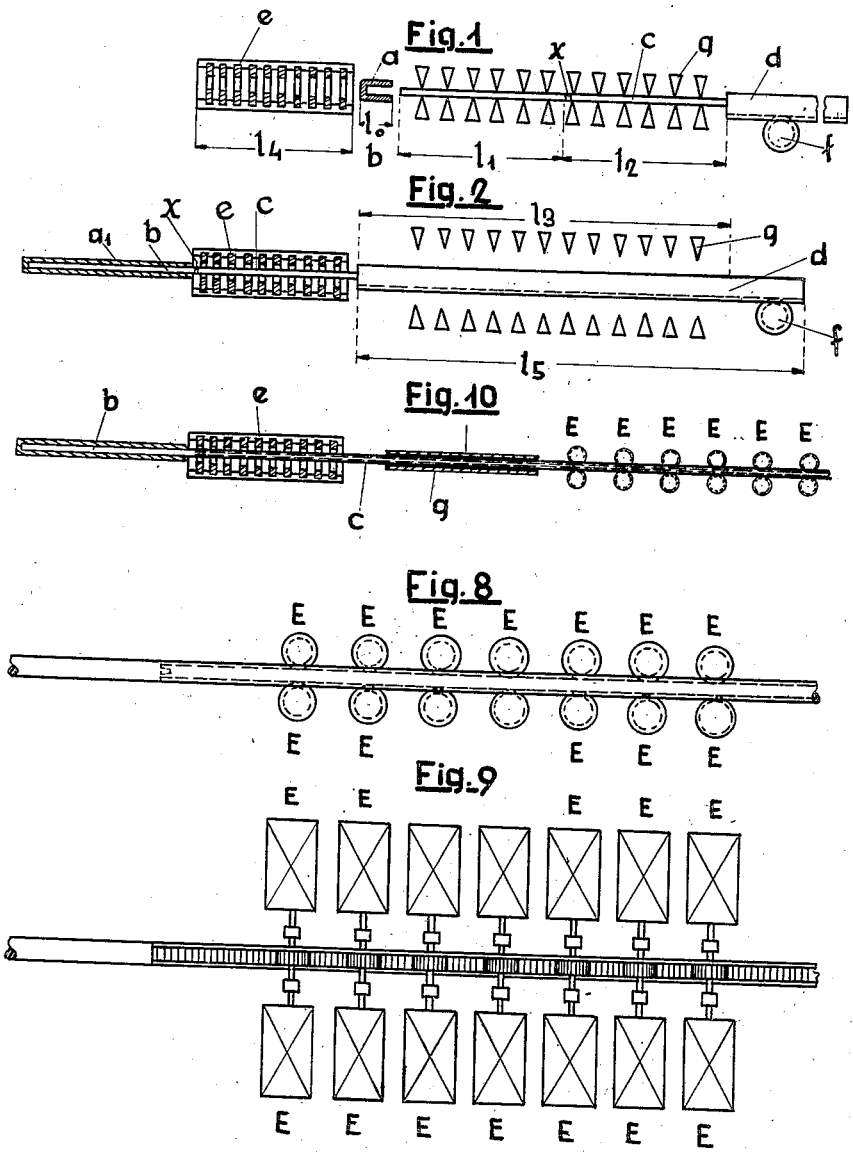

Patented May 27, 1941

2,243,382

UNITED STATES PATENT OFFICE 2,243,382

PUSH BENCH APPARATUS

Károly Korbuly, Csepel, Hungary, assignor to Tube Industrial Participation Limited, Breganzona-Lugano, a corporation of Switzerland Application February 17, 1940, Serial No. 319,537
In Hungary and Germany March 8, 1939

7 Claims. (Cl. 205—4)

In the manufacture of a metal tube by means of push bench drawing apparatus a cup-shaped billet $a$ (Fig. 1 of the accompanying drawings) carried on an end of a working mandrel $b$, attached at $x$ to a mandrel shaft $c$, is pushed through a series of drawing tools or dies $e$ by means of a ram $d$ impelling the mandrel shaft, whereby the material of the billet is spread lengthwise along the mandrel to form the tube. The tube and mandrel $b$ are removed from the apparatus whilst the ram $d$ and mandrel shaft $c$ are returned to their initial positions, whereupon a new mandrel $b$ and a new billet $a$ are inserted. Fig. 2 shows the apparatus at the stage at which the tube $a_1$ and the mandrel $b$ have issued from the dies $e$ whereas the mandrel shaft $c$ is within the dies and the forward end of the ram $d$ is near to the dies. The length of the several parts is determined by the following conditions:

The length $l_1$ of the working mandrel must be somewhat greater than that of the formed tube; the length $l_2$ of the mandrel shaft $c$ must be somewhat greater than the length $l_4$ of the die bed; the length $l_3$ of the stroke of the ram results from the sum of the length $l_0$ of the billet, the length $l_1$ of the mandrel and the length $l_2$ of the mandrel shaft. On account of the gear $f$, for advancing and withdrawing the ram $d$, the length $l_5$ of the ram itself must be somewhat greater than the length $l_3$ of its stroke. Owing to the considerable length of the mandrel means, composed of the mandrel and the mandrel shaft, such portion of it as is at any given time outside the series of dies $e$, is supported by guides $g$. These guides are generally so arranged that they can be moved apart (Fig. 2) to make room for the passage of the ram $d$. Alternatively, they may be provided (U. S. A. Patent No. 2,071,208) with slots for the passage of a ram of I-cross section. During the formation of a tube, therefore, not only the workpiece, the mandrel and the mandrel shaft, but also the comparatively considerable mass of the longest and heaviest members, viz. the ram and the rotor of the motor driving the gear $f$, must be accelerated to the tube-drawing velocity, then braked at the end of the working stroke, then re-accelerated to the retraction speed and then braked once more. The energy consumed for this purpose increases, in a high ratio, with the pushing speed. Consequently, the work of acceleration with the usual push bench drawing apparatus, even with its comparatively low tube-drawing velocity of 1.8 to 2 metres per second, is generally a multiple of the useful work performed. For this reason, it has been practically impossible to increase the working speed of the apparatus beyond the above mentioned limit. An increase in the working speed is, however, desirable not only for the purpose of the utilisation of the primary investment but also because an increase of the tube-drawing speed decreases the cooling of the work-piece and the heating of the working mandrel. The lesser the cooling of the workpiece the lesser is the pushing force needed and also the stresses suffered by the work-piece. Moreover, the reduced heating of the working mandrel increases its life, so that in certain circumstances, the mandrel need not be changed after each working stroke.

An object of the present invention is to enable an increased tube-drawing speed, by effecting a substantial reduction of the masses that have to be accelerated and decelerated.

According to the invention this result is achieved by dispensing with the ram and forming the rack teeth within the diameter of that part of the mandrel shaft which enters the drawing tools or dies during the working stroke of the bench.

The drive means may include several prime mover units each of which furnishes a fraction of the required total driving force and is coupled to a gear pinion or group of pinions. Some of the prime mover units and gears may be adapted to be set in operation only during each tube-drawing stroke, being uncoupled during each retraction of the mandrel shaft, so that the direction of running of the units need not be reversed. However, even when the same driving units are employed during the return strokes, the loss of energy is smaller, since the total mass inertia of the small units (motors with rotors of comparatively small diameter) is considerably less than in the case of a single motor having a driving force equivalent to the total driving force of the several small motors and, necessarily, a rotor of comparatively large diameter. As the result of subdividing the drive and of the reduced pushing force required, the stressing of the rack teeth is so reduced that the said teeth can be formed within the comparatively small diameter of the mandrel shaft.

Typical embodiments of the new drive means are diagrammatically illustrated in Figs. 3–9 of the accompanying drawings.

Fig. 3 shows a cross section of the mandrel shaft with its guides.

Fig. 4 shows a cross section of the mandrel shaft at a driving point.

Figs. 5 and 6 show two other possible embodiments of the drive means, in cross section through a driving point of the mandrel shaft.

Fig. 7 is a partly cut away side elevation of the embodiment shown in Fig. 4.

Fig. 8 is a side elevation and Fig. 9 a plan of an arrangement of the units driving the mandrel shaft.

Fig. 10 is a diagrammatic view showing the total length of the push bench drawing apparatus embodying the invention by comparison with Figs. 1 and 2 hereinbefore referred to.

According to Fig. 3, the mandrel shaft $c$ has a circular cross section which is smaller than the aperture of the smallest of the dies $e$ (Fig. 10) and is therefore able to pass through all of the dies. By means of a liner 2, the mandrel shaft is mounted in a closed tube 3 serving to guide said shaft. Rack teeth 4, which mesh with a pinion 5 (Fig. 4) are cut in a portion of the cross section of the shaft $c$. The pinion 5 is fixed on the rotor shaft of an electromotor 6.

According to Fig. 5, the mandrel shaft $c$ is provided with two toothed racks 4, 4', meshing with pinions 5, 5' and the paired pinions 5, 5' are fixed on the rotor shafts of separate driving motors 6, 6' respectively. In the modification according to Fig. 6 there is only one motor 6 for the paired pinions 5, 5' the pinion 5 being fixed on the rotor shaft of the motor and the drive being transmitted from this motor to the other pinion 5' through a pair of pinions 7, 7'.

As is evident from Figs. 3 and 4, the annular space between the mandrel shaft $c$ and the guide tube 3 is wide enough to allow of the insertion of interchangeable liners 2, the thickness of which can vary within wide limits. Consequently, the same push bench apparatus can be employed for producing tubes of different wall thickness. All that is necessary, apart from the usual adaptation of the dies, working mandrel and mandrel shaft to the cross section of the tube to be produced, is to exchange the liner 2 and the pinions 5. Thereby the transmission ratio of the pinions is varied in accordance with the tube-drawing force required for any particular tube diameter. When a thick liner is to be used, it is preferably composed of two coaxial parts 2 and $2a$, so that, when worn, only the inner part has to be renewed. The guide tube 3 is preferably divided, both crosswise and lengthwise (Fig. 7), so that the guide for the mandrel shaft consists of connected units 9, each of which serves as a bearing for a driving unit.

As shown in Figs. 8 and 9, the drive means for the mandrel shaft is divided into small units E, E which are set as close together as possible, so that only a fraction of the tube-drawing energy is applied to each point of engagement of the gear teeth. This arrangement enables the drive to be transmitted through the comparatively weak rack teeth prescribed by the small cross section of the mandrel shaft. Some of the driving motors can be coupled with the gears through disengageable clutches, so that, during the retracting movement of the mandrel shaft, these motors can be disconnected therefrom in order that their direction of rotation does not have to be changed, leaving only one, or a few, of the motors effective for the retraction of the mandrel shaft while the apparatus is idling.

To enable the several driving gears to be as close set as possible and to provide sufficient room for the accommodation of the motors, these latter may be alternately connected with the upper and lower pinions, or arranged alternately at opposite sides of the mandrel shaft. The motors can also be arranged in two rows at one side of the mandrel shaft, the rotor shafts of the more remote motors each passing between two of the less remote motors.

Since, with the new driving arrangement, the masses to be accelerated are substantially restricted to the working mandrel and the mandrel shaft, and therefore reduced to a minimum, the tube-drawing speed can be substantially increased. As the result, the workpiece loses only a small amount of heat during the tube formation and consequently the resistance of the material is diminished, so that, on account of the substantially reduced mass inertia, the energy required also decreases to a fraction of that hitherto needed.

The diagram Fig. 10 shows that, in rear of the working mandrel $b$, the apparatus according to the invention has merely a toothed mandrel shaft $c$. This can pass through the entire series of dies $e$ and through the mandrel guide $g$, which is opened only for the insertion of the working mandrel, but is otherwise closed. The mandrel shaft is guided throughout the whole of that portion of its length which is stressed in compression, and constantly meshes with the pinions of the driving units E. Of course, owing to the subdivision of the drive, the mandrel shaft must be longer than in the case of a push bench apparatus provided with a ram such as $d$ in Figs. 1 and 2; nevertheless, the weight of the driven mandrel shaft is only a fraction of the weight of the usual ram and mandrel shaft.

By correspondingly increasing the working speed, the heating and wear of the working mandrel can be so far diminished that the mandrel need not be changed after each tube-drawing stroke but, during the return stroke of the mandrel shaft, can be withdrawn from the formed tube while this is held back by means of a stripper. In this manner the construction of the apparatus can be further simplified and its output capacity further increased.

What I claim is:

1. In a tube drawing push bench a plurality of drawing dies, a reciprocating mandrel shaft of circular cross section, racks formed within the circular cross section of said mandrel shaft, a plurality of pinions engaging said racks, and driving means to push said mandrel shaft through said drawing dies.

2. In a tube drawing push bench a plurality of drawing dies, a reciprocating mandrel shaft of circular cross section, racks formed within the circular cross section of said mandrel shaft, a plurality of pinions engaging said racks, and a plurality of driving motors coupled by means of disengageable clutches to different pinions to push said mandrel shaft through said drawing dies.

3. In a tube drawing push bench a plurality of drawing dies, a reciprocating mandrel shaft of circular cross section, racks formed within the circular cross section of said mandrel shaft, a plurality of pinions engaging said racks, a guiding tube surrounding said mandrel shaft between the drawing dies and said pinions and driving means to push said mandrel shaft through said drawing dies.

4. In a tube drawing push bench a plurality of drawing dies, a reciprocating mandrel shaft of circular cross section, racks formed within the circular cross section of said mandrel shaft, a plurality of pinions engaging said racks, a guiding tube surrounding said mandrel shaft between the drawing dies and said pinions, and interchangeable liner within said guiding tube, and driving means to push said mandrel shaft through said drawing dies.

5. In a tube drawing push bench a plurality of drawing dies, a reciprocating mandrel shaft of circular cross section, racks formed within the circular cross section of said mandrel shaft, a plurality of pinions engaging said racks, a guiding tube surrounding said mandrel shaft between the drawing dies and said pinions, and interchangeable liner comprising two coaxial parts within said guiding tube, and driving means to push said mandrel shaft through said drawing dies.

6. In a tube drawing push bench a plurality of drawing dies, a reciprocating mandrel shaft of circular cross section, racks formed within the circular cross section of said mandrel shaft, a plurality of pinions engaging said racks, a guiding tube surrounding said mandrel shaft between the drawing dies and said pinions, said guiding tube being subdivided crosswise and lengthwise and containing a bearing for a driving unit, and driving means to push said mandrel shaft through said drawing dies.

7. A push bench according to claim 1, in which the working mandrel is coupled to the mandrel shaft in such a manner that the mandrel is carried along by the mandrel shaft during the return movement of the latter.

KÁROLY KORBULY.